(12) United States Patent
Fujimoto

(10) Patent No.: US 9,159,004 B1
(45) Date of Patent: Oct. 13, 2015

(54) IMAGE FORMING APPARATUS THAT FACILITATES EARLY ELIMINATION OF FAILURE

(71) Applicant: KYOCERA Document Solutions Inc., Osaka (JP)

(72) Inventor: Norie Fujimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/643,631

(22) Filed: Mar. 10, 2015

(30) Foreign Application Priority Data

Mar. 28, 2014 (JP) ................. 2014-070408

(51) Int. Cl.
*G06K 15/00* (2006.01)
*G06K 15/02* (2006.01)
*G06F 3/12* (2006.01)

(52) U.S. Cl.
CPC ............ *G06K 15/1806* (2013.01); *G06F 3/121* (2013.01); *G06F 3/1237* (2013.01); *G06F 3/1292* (2013.01); *G06K 15/408* (2013.01)

(58) Field of Classification Search
USPC ............................................... 358/1.13, 1.14
See application file for complete search history.

(56) References Cited

U.S. PATENT DOCUMENTS

| | | | |
|---|---|---|---|
| 8,351,811 B2* | 1/2013 | Ishio et al. | G03G 15/6552 399/366 |
| 8,976,381 B2* | 3/2015 | Suwabe | G03G 15/50 358/1.13 |
| 2014/0293980 A1* | 10/2014 | Shibata | H04W 88/06 370/338 |

FOREIGN PATENT DOCUMENTS

| JP | 2002-209035 A | 7/2002 |
|---|---|---|
| JP | 2003-150362 A | 5/2003 |

* cited by examiner

*Primary Examiner* — Allen H Nguyen
(74) *Attorney, Agent, or Firm* — Stein IP, LLC

(57) ABSTRACT

An image forming apparatus includes an internal device that executes a job, a controller, a user management unit, a lock requesting unit, and an unlock requesting unit. The controller suspends the execution of the job when the controller detects a predetermined failure in the internal device during the execution of the job, and resumes the suspended job or starts execution of a next job when the controller detects an elimination of the failure. The user management unit specifies identification information of a user mobile device associated with a user. The lock requesting unit transmits a lock request with the identification information to a predetermined server when the controller has suspended the job. The unlock requesting unit transmits an unlock request with the identification information to the predetermined server when the controller has resumed the suspended job or when the controller has started the execution of the next job.

6 Claims, 3 Drawing Sheets

IMAGE FORMING APPARATUS THAT FACILITATES EARLY ELIMINATION OF FAILURE

INCORPORATION BY REFERENCE

This application is based upon, and claims the benefit of priority from, corresponding Japanese Patent Application No. 2014-070408 filed in the Japan Patent Office on Mar. 28, 2014, the entire contents of which are incorporated herein by reference.

BACKGROUND

Unless otherwise indicated herein, the description in this section is not prior art to the claims in this application and is not admitted to be prior art by inclusion in this section.

With an image forming apparatus such as a multi-functional peripheral, which is used by a plurality of users, the users do not always come for printed matters in the order of execution of jobs. Accordingly, when the user goes for his/her printed matter, a failure, such as a jam, may occur in a previous job executed by another user. In this case, his/her printed matter is still unprinted.

The user usually dislikes operating the job by executed by another user without permission. Accordingly, until the user who executed the job where the jam occurs eliminates the failure (or until another person who is requested to eliminate the failure eliminates the failure), the jam is often neglected.

Therefore, a certain image forming apparatus notifies a user's portable terminal or a similar terminal of the jam.

SUMMARY

An image forming apparatus act according to one aspect of the disclosure includes an internal device that executes a job, a controller, a user management unit, a lock requesting unit, and an unlock requesting unit. The controller monitors the internal device, suspends the execution of the job when the controller detects a predetermined failure in the internal device during the execution of the job, and resumes the suspended job or starts execution of a next job when the controller detects an elimination of the failure. The user management unit specifies a user who has requested the execution of the job suspended by the controller, and specifies identification information of a user mobile device associated with the specified user. The lock requesting unit transmits a lock request with the identification information specified by the user management unit to a predetermined server, so as to execute a remote lock on the user mobile device when the controller has suspended the job. The unlock requesting unit transmits an unlock request with the identification information specified by the user management unit to the predetermined server, so as to unlock the remote lock on the user mobile device when the controller has resumed the suspended job or when the controller has started the execution of the next job.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
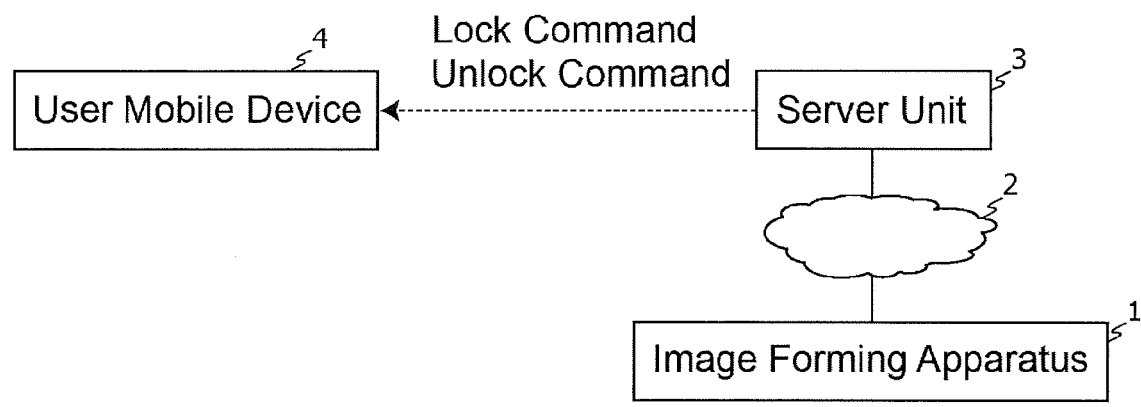
FIG. 1 illustrates a configuration of a system that includes an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure based on the drawings.

FIG. 1 illustrates a configuration of a system that includes an image forming apparatus 1 according to one embodiment of the disclosure. In the system, the image forming apparatus 1 is connected to a network 2, and the network 2 is connected to a server unit 3.

In the embodiment, the image forming apparatus 1 is a multi-functional peripheral. However, the image forming apparatus 1 may be another type of apparatus that has printing function, such as a printer, a facsimile device and a copier. The network 2 is a Local Area Network (LAN) and/or Wide Area Network (WAN).

The server unit 3 is a server that accepts a lock request and an unlock request from the image forming apparatus 1. The server unit 3 issues a lock command to a user mobile device 4, which is specified by a lock request, to lock the user mobile device 4 remotely. The server unit 3 also issues an unlock command to the user mobile device 4, which is specified by an unlock request, to unlock the remotely locked user mobile device 4. The server unit 3 transmits a lock command and an unlock command to the user mobile device 4 via a mobile phone network and the network 2 or similar medium.

The user mobile device 4 is, for example, a smart phone or a mobile phone, and has remote lock function. In the remote lock function, when the user mobile device 4 receives a lock command, the remote lock function prohibits users from operating the user mobile device 4.

Remote lock function is commonly used in response to a request by a user when the user mobile device 4 is, for example, stolen or lost. In the embodiment, the image forming apparatus 1 locks the user mobile device 4 using the remote lock function when a user needs to eliminate a failure by hand to continue a job.

Figure 2:
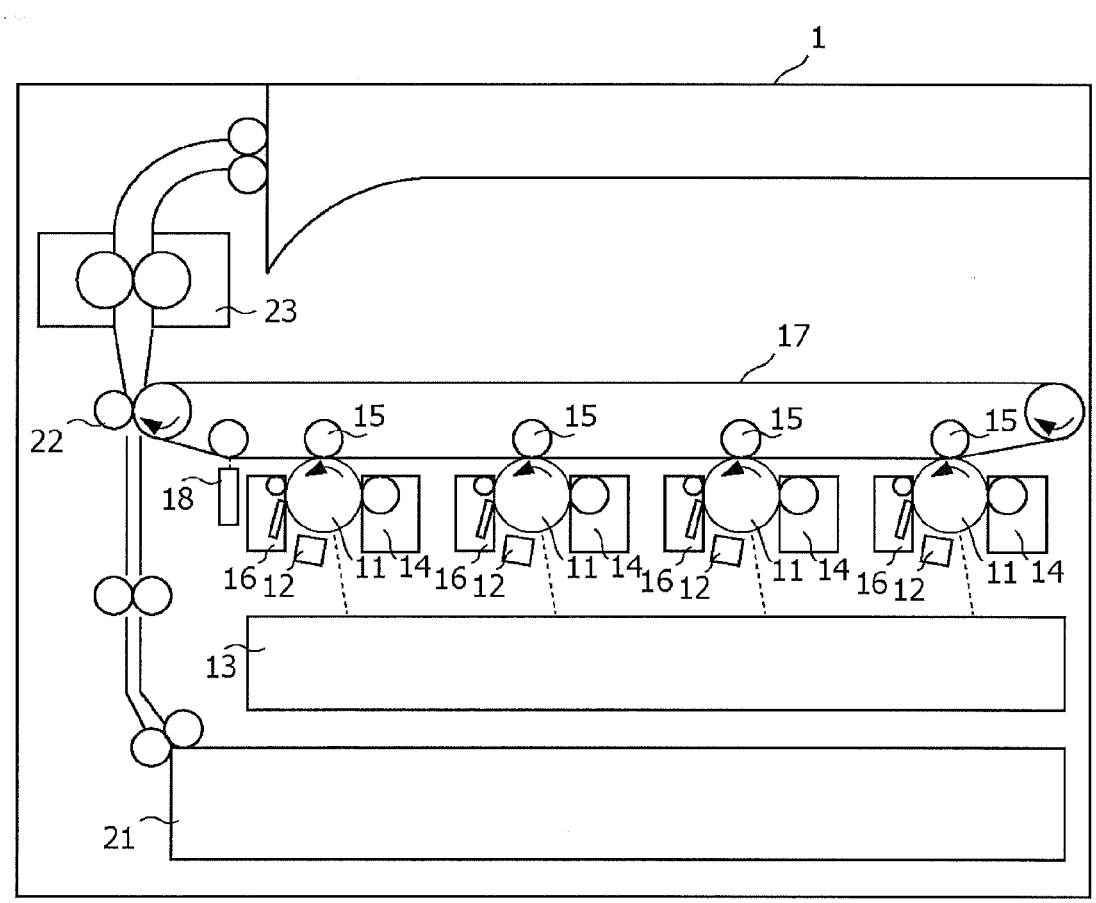
FIG. 2 illustrates a side of a mechanical internal configuration of an image forming apparatus according to the one embodiment.

FIG. 2 illustrates a side view of a mechanical internal configuration of the image forming apparatus 1 in FIG. 1. The image forming apparatus 1 is an apparatus that has a printing function using electrophotographic method, such as a printer, a facsimile device, a copier, and a multi-functional peripheral.

In the embodiment, the image forming apparatus 1 includes a color developing device with a tandem engine. The color developing device includes a photoreceptor drum 11, a charger 12, an exposure apparatus 13, a developing unit 14, a transfer roller 15, a cleaning unit 16, and a static eliminator (not illustrated) for the respective colors of cyan, magenta, yellow, and black.

The photoreceptor drum 11 is a cylindrically-shaped photoreceptor and an image carrier where the exposure apparatus 13 forms an electrostatic latent image on the face of the photoreceptor. The photoreceptor drum 11 employs inorganic photoreceptor such as an amorphous silicon photoreceptor.

The charger 12 charges the surface of the photoreceptor drum 11 at a predetermined electric potential based on a process condition.

The exposure apparatus 13 is an apparatus that forms an electrostatic latent image by irradiating the photoreceptor drum 11 with a laser beam. The exposure apparatus 13 includes a laser diode, which is a light source, and an optical device (such as a lens, a mirror, and a polygon mirror), which guides the laser beam to the photoreceptor drum 11.

The developing unit 14 develops the electrostatic latent image on the photoreceptor drum 11 using toners based on a process condition, and forms a toner image.

The transfer roller 15 transfers the toner image on the photoreceptor drum 11 onto an intermediate transfer belt 17. The cleaning unit 16 recovers the remnant toner on the photoreceptor drum 11 after transferring the toner image on the intermediate transfer belt 17. The intermediate transfer belt 17 contacts the photoreceptor drum 11, and is an annular intermediate transfer component on which the toner image on the photoreceptor drum 11 is transferred. The intermediate transfer belt 17 is stretched around, for example, a drive roller, and moves circularly by the driving power of the drive roller.

A image density sensor 18 is a reflection-type image density sensor that irradiates the intermediate transfer belt 17 with a light and detects the reflected light, so as to detect a density of a toner image on the intermediate transfer belt 17.

A transfer roller 22 brings a paper conveyed from a paper sheet feeder 21 such as a sheet feed tray into contact with the intermediate transfer belt 17, so as to transfer the toner image on the intermediate transfer belt 17 on the paper. The paper on which the toner image is transferred is conveyed to a fuser 23, and the toner image is fixed on the paper.

Figure 3:
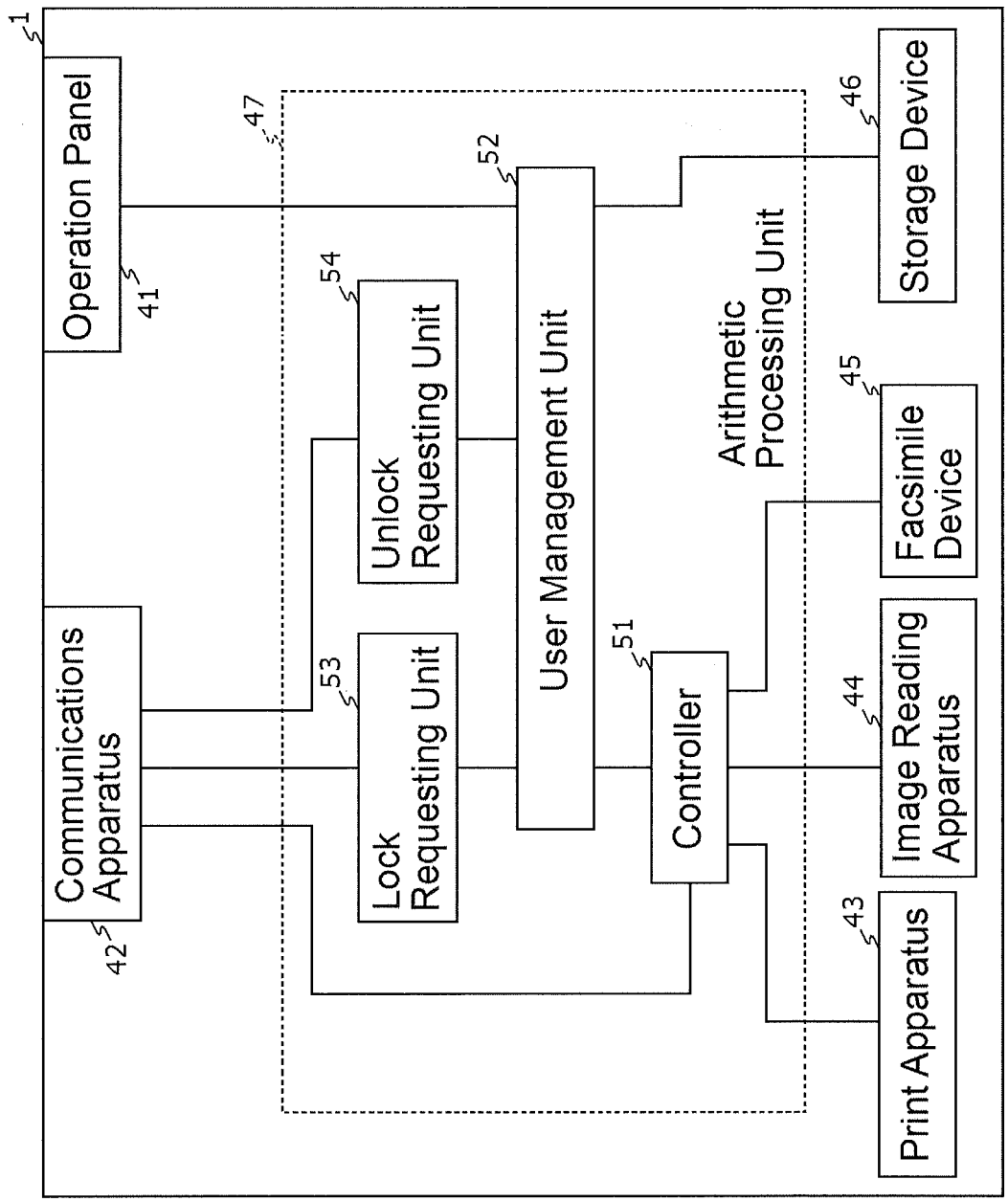
FIG. 3 illustrates an electrical configuration of the image forming apparatus according to the one embodiment.

FIG. 3 illustrates an electrical configuration of the image forming apparatus 1 in FIG. 1.

As illustrated in FIG. 3, the image forming apparatus 1 includes an operation panel 41, a communications apparatus 42, a print apparatus 43, an image reading apparatus 44, a facsimile device 45, a storage device 46, and an arithmetic processing unit 47.

The operation panel 41 includes a display apparatus such as a liquid crystal display and an input apparatus such as a touch panel. The operation panel 41 displays an operation screen for users, and detects a user operation.

The communications apparatus 42 is connectable to another apparatus in the system (such as the server unit 3) via the network 2. The communications apparatus 42 is an apparatus that performs data communications in a predetermined communication protocol.

The print apparatus 43 is an internal device that prints a document image on a printing paper sheet by an electrophotographic method using, for example, the mechanism illustrated in FIG. 2. The print apparatus 43 performs a predetermined image process, such as a rasterization, a color conversion, a screen process, on an original image data, so as to generate output image data. The print apparatus 43 prints based on the generated output image data.

The image reading apparatus 44 is an internal device that optically reads a document image from a document to generate image data of the document image.

The facsimile device 45 is an internal device that transmits a facsimile signal converted from image data of a transmission object, and also receives a facsimile signal and then converts the facsimile signal into image data, for example.

The storage device 46 is a non-volatile storage device storing user registration data and similar data. The user registration data includes a user ID of a registered user for login to the image forming apparatus 1 (or a pair of a user ID and a password), identification information on the user mobile device 4 of the registered user (for example, telephone numbers), and similar data, which are mutually associated.

The arithmetic processing unit 47 is a computer, which has a central processing unit (CPU), a read only memory (ROM), a random access memory (RAM), and similar member. The arithmetic processing unit 47 loads the programs, which are stored in the non-transitory ROM and similar member, into the RAM and executes the program at the CPU. This causes the arithmetic processing unit 47 to function as various processing units. Here, the arithmetic processing unit 47 functions as a controller 51, a user management unit 52, a lock requesting unit 53, and an unlock requesting unit 54.

The controller 51 monitors internal devices (such as the print apparatus 43, the image reading apparatus 44, the facsimile device 45, and the communications apparatus 42), which execute a print job, a copy job, a scan job, a facsimile transmission job, and a scan to send job. When the controller 51 detects a predetermined failure in an internal device during a job execution, the controller 51 suspends the job execution. When the controller 51 detects an elimination of the failure, the controller 51 resumes the suspended job, or executes the next job.

Here, the detected failure is a failure where a user needs to physically eliminate a failure of the image forming apparatus 1 (for example, elimination of a failure by hand) for resuming a job progress. This type of failure includes: (a) a paper jam while the mechanism illustrated in FIG. 2 feeds, conveys or discharges a paper sheet, and (b) a transmission error of a facsimile, an internet facsimile, or a scan to send. Eliminating a transmission error requires a user to operate on the operation panel 41 (an operation such as transmitting again, cancellation of a transmission, changing an address).

When a job is executed in response to a request from the operation panel 41, the user mobile device 4, or a host apparatus (not illustrated) by a user, the user management unit 52 identifies the user. For the request from the operation panel 41, the user management unit 52 identifies the user by the input user ID for login, for example. For the request from the user mobile device 4, or the host apparatus (not illustrated), the user management unit 52 identifies the user by, for example, the user ID included in the request.

The user management unit 52 identifies a user who has requested to execute a job that is suspended by the controller 51, and then identifies identification information on the user mobile device 4 associated with the identified user based on user registration data stored in the storage device 46.

When a job is suspended by the controller 51, the lock requesting unit 53 uses the communications apparatus 42 to transmit a lock request with identification information identified by the user management unit 52 to the server unit 3. This remotely locks the user mobile device 4.

When the job suspended by the controller 51 is resumed or the next job is executed, the unlock requesting unit 54 uses the communications apparatus 42 to transmit an unlock request with identification information identified by the user management unit 52 to the server unit 3. This unlocks the remotely locked user mobile device 4.

Figure 4:
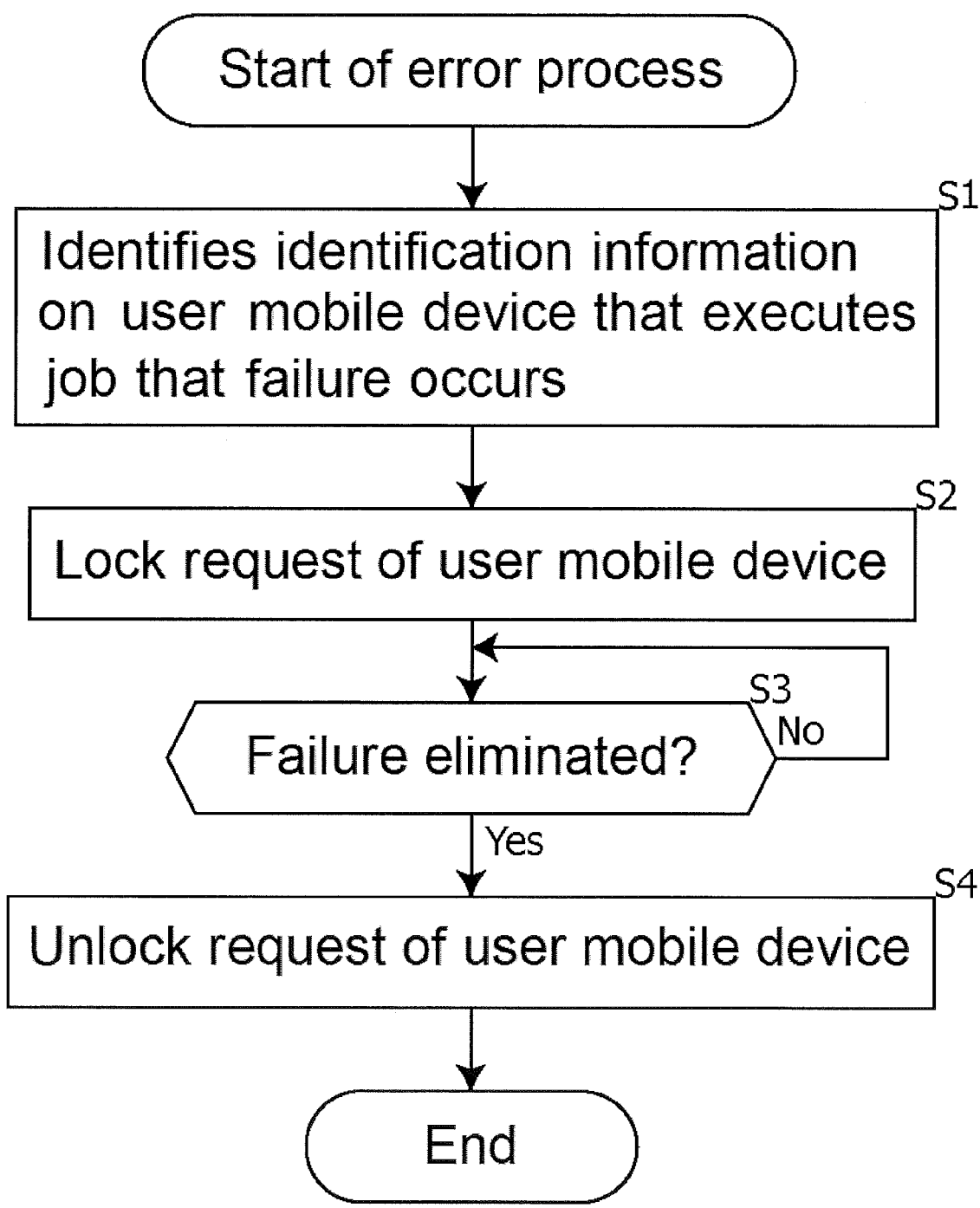
FIG. 4 illustrates an operation when the image forming apparatus according to the one embodiment has detected a failure.

Next, the following describes operations of the image forming apparatus 1. FIG. 4 illustrates an operation when the image forming apparatus 1 illustrated in FIG. 2 and FIG. 3 has detected a failure.

When the controller 51 accepts a job request, the controller 51 identifies a user who has requested the job and then uses an internal device to execute the requested job.

When the controller 51 detects an occurrence of a failure during a job execution, the controller 51 suspends the job execution.

When the controller 51 suspends a job execution, the user management unit 52 identifies a user who has requested to execute a suspended job, and then identifies identification information on the user mobile device 4 associated with the identified user based on user registration data stored in the storage device 46 (Step S1).

Then, the lock requesting unit 53 uses the communications apparatus 42 to transmit a lock request with identification information on the user mobile device 4 identified by the user management unit 52 to the server unit 3 (Step S2). This remotely locks the user mobile device 4. When the server unit 3 receives the lock request, the server unit 3 remotely locks the specified user mobile device 4.

When the server unit 3 remotely locks the user mobile device 4, the user mobile device 4 displays a message in which a failure causes a job to suspend and thus the user needs to eliminate the failure, based on a command from the server unit 3.

Thus, the user with the user mobile device 4 knows that a failure has occurred during his/her job execution. This causes the user to know that the user needs to eliminate the failure of the image forming apparatus 1 in order to use the user mobile device 4.

After detecting an occurrence of a failure, the controller 51 monitors whether the failure has been eliminated or not (Step S3). After the user eliminates the failure as described above, the controller 51 detects the elimination of the failure, and then resumes the suspended job or executes the next job stored in a job queue.

Thus, when the controller 51 detects the elimination of the failure, the unlock requesting unit 54 uses the communications apparatus 42 to transmit an unlock request with identification information on the user mobile device 4 identified by the user management unit 52 to the server unit 3 (Step S4). This unlocks the remotely locked user mobile device 4. When the server unit 3 receives the unlock request, the server unit 3 unlocks the remotely locked and specified user mobile device 4. This allows the user to use the user mobile device 4.

As described above, according to the above-described embodiment, the controller 51 monitors the internal devices that execute a job. When the controller 51 detects a predetermined failure in an internal device during a job execution, the controller 51 suspends the job execution. When the controller 51 detects an elimination of the failure, the controller 51 resumes the suspended job or executes the next job. The user management unit 52 identifies a user who has requested to execute a job that is suspended by the controller 51, and then identifies identification information on the user mobile device 4 associated with the identified user. When the job is suspended by the controller 51, the lock requesting unit 53 transmits a lock request with identification information identified by the user management unit 52 to the server unit 3. This remotely locks the user mobile device 4. Subsequently, when the job suspended by the controller 51 is resumed or the next job is executed, the unlock requesting unit 54 transmits an unlock request with identification information identified by the user management unit 52 to the server unit 3. This unlocks the remotely locked user mobile device 4.

This allows the user who has executed a job where a failure occurs in the image forming apparatus 1 to eliminate the failure early without a workload on another user.

The disclosure is applicable to, for example, an image forming apparatus available for a plurality of users.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
    an internal device that executes a job;
    a controller that monitors the internal device, suspends the execution of the job when the controller detects a predetermined failure in the internal device during the execution of the job, and resumes the suspended job or starts execution of a next job when the controller detects an elimination of the failure;
    a user management unit that specifies a user who has requested the execution of the job suspended by the controller, and specifies identification information of a user mobile device associated with the specified user;
    a lock requesting unit that transmits a lock request with the identification information specified by the user management unit to a predetermined server, so as to execute a remote lock on the user mobile device when the controller has suspended the job; and
    an unlock requesting unit that transmits an unlock request with the identification information specified by the user management unit to the predetermined server, so as to unlock the remote lock on the user mobile device when the controller has resumed the suspended job or when the controller has started the execution of the next job.

2. The image forming apparatus according to claim 1, wherein the failure includes a jam.

3. The image forming apparatus according to claim 1, wherein the failure includes a transmission error in one of a facsimile, an Internet facsimile, and a Scan-to-Send.

4. The image forming apparatus according to claim 1, wherein the user mobile device is a smart phone or a mobile phone.

5. A method of image forming using an internal device that executes a job, comprising:
    monitoring the internal device, suspends the execution of the job when a predetermined failure is detected in the internal device during the execution of the job, and resumes the suspended job or starts execution of a next job when the controller detects an elimination of the failure;
    specifying a user who has requested the execution of the job suspended by the controller, and specifies identification information of a user mobile device associated with the specified user;
    transmitting a lock request with the identification information specified by the user management unit to a predetermined server, so as to execute a remote lock on the user mobile device when the controller has suspended the job; and transmitting an unlock request with the identification information specified by the user management unit to the predetermined server, so as to unlock the remote lock on the user mobile device when the controller has resumed the suspended job or when the controller has started the execution of the next job.

6. A non-transitory computer-readable recording medium storing an image forming program to control an image forming apparatus having an internal device that executes a job, the image forming program causing the image forming apparatus to function as:

a controller that monitors the internal device, suspends the execution of the job when the controller detects a predetermined failure in the internal device during the execution of the job, and resumes the suspended job or starts execution of a next job when the controller detects an elimination of the failure;

a user management unit that specifies a user who has requested the execution of the job suspended by the controller, and specifies identification information of a user mobile device associated with the specified user;

a lock requesting unit that transmits a lock request with the identification information specified by the user management unit to a predetermined server, so as to execute a remote lock on the user mobile device when the controller has suspended the job; and an unlock requesting unit that transmits an unlock request with the identification information specified by the user management unit to the predetermined server, so as to unlock the remote lock on the user mobile device when the controller has resumed the suspended job or when the controller has started the execution of the next job.

\* \* \* \* \*